(12) United States Patent  
Sano et al.

(10) Patent No.: US 6,980,489 B2  
(45) Date of Patent: Dec. 27, 2005

(54) INFORMATION RECORDING/REPRODUCING APPARATUS FOR RECORDING/REPRODUCING INFORMATION WITH RESPECT TO INFORMATION STORING MEDIUM WITH GUIDE TRACKS AND INFORMATION TRACKS, AND TRACKING METHOD USING THE INFORMATION STORING MEDIUM

(75) Inventors: Kousei Sano, Neyagawa (JP); Shin-ichi Kadowaki, Sanda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 501 days.

(21) Appl. No.: 10/421,019

(22) Filed: Apr. 21, 2003

(65) Prior Publication Data

US 2003/0193845 A1 Oct. 16, 2003

Related U.S. Application Data

(62) Division of application No. 09/481,268, filed on Jan. 11, 2000.

(30) Foreign Application Priority Data

Jan. 12, 1999 (JP) ............................................ 11-005007

(51) Int. Cl.[7] .............................. G11B 11/00; G11B 7/24
(52) U.S. Cl. ............................... 369/13.11; 369/30.15; 369/375.3; 369/44.26

(58) Field of Search ........................... 369/13.11, 13.12, 369/13.17, 13.24, 275.3, 275.4, 40.26, 40.34, 30.15, 44.36, 44.41, 44.37, 44.23, 44.24

(56) References Cited

U.S. PATENT DOCUMENTS

| 4,884,259 A | * 11/1989 | Horikawa et al. | ....... 369/44.26 |
| 4,958,245 A | 9/1990 | Roth et al. | |
| 5,065,387 A | 11/1991 | Roth et al. | |
| 5,406,545 A | 4/1995 | Kadowaki | |
| 5,650,987 A | 7/1997 | Kadowaki | |
| 5,892,741 A | 4/1999 | Kadowaki et al. | |
| 6,252,845 B1 | * 6/2001 | Hino et al. | ............. 369/275.3 |

FOREIGN PATENT DOCUMENTS

| JP | 6-52551 | 2/1994 |
| JP | 7-282457 | 10/1995 |

* cited by examiner

*Primary Examiner*—Ali Neyzari  
(74) *Attorney, Agent, or Firm*—Merchant & Gould P.C.

(57) ABSTRACT

A magnetic tape has a guide track for optically obtaining a tracking signal and an independent information track for storing information. The magnetic tape is partitioned into different kinds of zones. The guide tracks are provided with grooves or pits serving as tracking marks, and the tracking marks are selectively located in the zones depending on the kind of zone. Thus, the track spacing of the guide tracks in each zone can be increased, so that a tracking control can be performed for a high density recording medium without reducing the spot size of the light.

2 Claims, 15 Drawing Sheets

INFORMATION RECORDING/REPRODUCING APPARATUS FOR RECORDING/REPRODUCING INFORMATION WITH RESPECT TO INFORMATION STORING MEDIUM WITH GUIDE TRACKS AND INFORMATION TRACKS, AND TRACKING METHOD USING THE INFORMATION STORING MEDIUM

This application is a divisional of application Ser. No. 09/481,268, filed Jan. 11, 2000, which application(s) are incorporated herein by reference.

BACKGROUND OF THE INVENTION

1. Field of the Invention

The present invention relates to an information storing medium, such as a magnetic disk or a magnetic tape, an optical disk, an optical card, or an optomagnetic disk, having information tracks for recording or reproducing information, and separate guide tracks for generating a tracking signal for performing tracking control. The present invention also relates to an information recording/reproducing apparatus for recording/reproducing information with respect to such an information storing medium, and to a tracking method using such an information storing medium.

2. Description of the Prior Art

FIG. 14 shows an example of the structure of a conventional magnetic tape serving as an information storing medium. Several series of information (three in FIG. 14) are recorded on this magnetic tape 601. These series of information are called information tracks 602. The spacing between an information track and its neighboring information track is called information track spacing, and is denoted as Tp. Guide tracks 603 for optical tracking control also are arranged on the magnetic tape 601. The spacing between a guide track 603 and its neighboring guide track 603 is called guide track spacing, and is denoted as Gp. On the guide tracks 603, grooves are arranged as tracking marks, having a suitable depth and width for being read optically.

There is a one-to-one correspondence between the guide tracks 603 and the information tracks 602, and the values for Tp and Gp are identical. Three light beams, emitted from an optical head, form three spots 701, 702 and 703 on the magnetic tape 601. The three spots 701, 702 and 703 are arranged obliquely with respect to the guide tracks 603 on the magnetic tape 601, and are irradiated at different positions in the Y-direction. The three light beams reflected from the magnetic tape 601 return to the optical head and enter a photo-detector. FIG. 15 is a circuit diagram showing a conventional example of obtaining a tracking signal. The photo-detectors 801, 802 and 803 receive the light beams 704, 705 and 706, and output a signal corresponding to the irradiated light amount. Here, the light beam 704 corresponds to the spot 701 on the magnetic tape 601, the light beam 705 corresponds to the spot 702, and the light beam 706 corresponds to the spot 703. The signals output from the photo-detectors 801 to 803 are sent to I-V amps 804 to 806, which give out a voltage signal. The signal given out by the I-V amp 804 is called S10, the signal given out by the I-V amp 805 is called SM0, and the signal given out by the I-V amp 806 is called S20. The differential amplifier circuit 807 receives the signals S10 and S20 and gives out a differential signal. The signal given out by the differential amplifier circuit 807 is the tracking signal, which is given out from a terminal 808.

This method for obtaining a tracking signal from the three light beams, is known as the three-beam method, for example in optical disk drives.

As shown in FIG. 3 of the present invention explained below, the optical head 300 and the magnetic head 301 lie on the same base and can be moved into the Y-direction of the magnetic tape with a transfer system 302. Based on the tracking signal obtained from the terminal 808, the magnetic head 301 performs a tracking control so that the magnetic head 301 is positioned above the information track 602 of the magnetic tape 601.

Recording/reproduction with other information tracks is performed by track jumping to different guide tracks.

A method for obtaining a tracking signal of high density with a conventional spot size is disclosed in Publication of Unexamined Japanese Patent Application (Tokkai) No. Hei 6-096453 (U.S. Pat. Nos. 5,406,545 and 5,650,987). In this method, the track spacing of the servo pattern region is twice the track spacing of the pit rows of the data region, two tracking signals with different phase are generated from the servo pattern region, and the product of the two tracking signals is calculated to obtain a tracking signal that is suitable for reproducing the pit rows of the data region. Consequently, the structure and the disclosed technological principle is different from the present invention. FIG. 5 of Tokkai Hei 6-096453 is structurally similar to the present invention, but the information tracks and guide tracks of the present invention are coplanar, so that its configuration is different from the present invention.

Tokkai Hei 6-052551 contains similar disclosures as Tokkai Hei 6-96453, but its configuration and principle are different from the present invention.

The track spacing of the guide tracks is determined by the spot size of the beams irradiated from the optical head. If the spot size is not made small, there is the problem that the track spacing of the information tracks cannot be made small, and it is not possible to raise the recording density.

SUMMARY OF THE INVENTION

It is an object of the present invention to achieve higher density with a simple optical system in the optical tracking signal detection of, for example, a magnetic tape, and in light of the problems of conventional apparatuses, to provide an information storing medium with high recording density allowing reliable tracking control with conventional spot sizes, an information recording/reproducing apparatus for recording/reproducing information on such an information storing medium, and a tracking method for performing tracking control with such an information storing medium.

To achieve these objects, a first information storing medium in accordance with the present invention has a guide track and an independent information track for storing information, the information storing medium being partitioned into different kinds of zones, the guide tracks being provided with tracking marks, and the tracking marks being selectively located in the zones depending on the kind of zone.

Furthermore, to achieve these objects, a second information storing medium in accordance with the present invention is partitioned in N kinds of zones, and tracking marks in a first kind of zone are located in a first guide track and then every N tracks starting with the first guide track, i.e. on the (n·N+1)-th guide tracks (wherein n is a natural number), tracking marks in a second kind of zone are located in a second guide track adjacent to the first guide track and then every N tracks starting with the second guide track, i.e. on the (n·N+2)-th guide tracks, and in this order, tracking marks in an N-th kind of zone are located in an N-th guide track and then every N tracks starting with the N-th guide track, i.e. on the (n·N+2)-th guide tracks.

In the first and second information storing medium, it is preferable that the tracking marks are either one of concave portions and convex portions on the information storing medium.

It is also preferable that the tracking marks have a reflectivity that is different from that of another portion of the information storing medium.

It is also preferable that the information storing medium further comprises an optomagnetic recording film, wherein the tracking marks are formed in the optomagnetic recording film.

To achieve the above-mentioned objects, an information recording/reproducing apparatus in accordance with the present invention comprises:

an optical head for irradiating light onto an information storing medium having a guide track and an independent information track for storing information, wherein the information storing medium is partitioned into different kinds of zones, and tracking marks on the guide tracks are selectively located in the zones depending on the kind of zone;

a tracking signal generation means for outputting a tracking signal based on a signal that is output from the optical head;

a control means for performing tracking control based on the tracking signal; and a recording/reproducing means for performing at least one of recording and reproducing information with respect to the information storing medium.

In this information recording/reproducing apparatus, it is preferable that the tracking signal generation means further comprises:

a selection control means for controlling the selection of a certain kind of zone on the information storing medium partitioned into a plurality of zones; and a signal holding means for holding a signal obtained from a selected kind of zones.

To achieve the above-mentioned objects, a tracking method performs tracking control based on a signal obtained from a certain kind of zone that is selectively derived from signals obtained by irradiating light onto an information storing medium having a guide track and an independent information track for storing information, the information storing medium being partitioned into different kinds of zones, and tracking marks on the guide tracks being selectively located in the zones depending on the kind of zone.

With these configurations and this method, it is possible to provide an information storing medium with high recording density allowing reliable tracking control with conventional spot sizes, an information recording/reproducing apparatus for recording/reproducing information on such an information storing medium, and a tracking method for performing tracking control with such an information storing medium.

DESCRIPTION OF THE PREFERRED EMBODIMENTS

The following is a description of the preferred embodiments of the present invention, with reference to FIGS. 1 to 13. In all the drawings, elements with the same symbols have the same function.

First Embodiment

Figure 1:
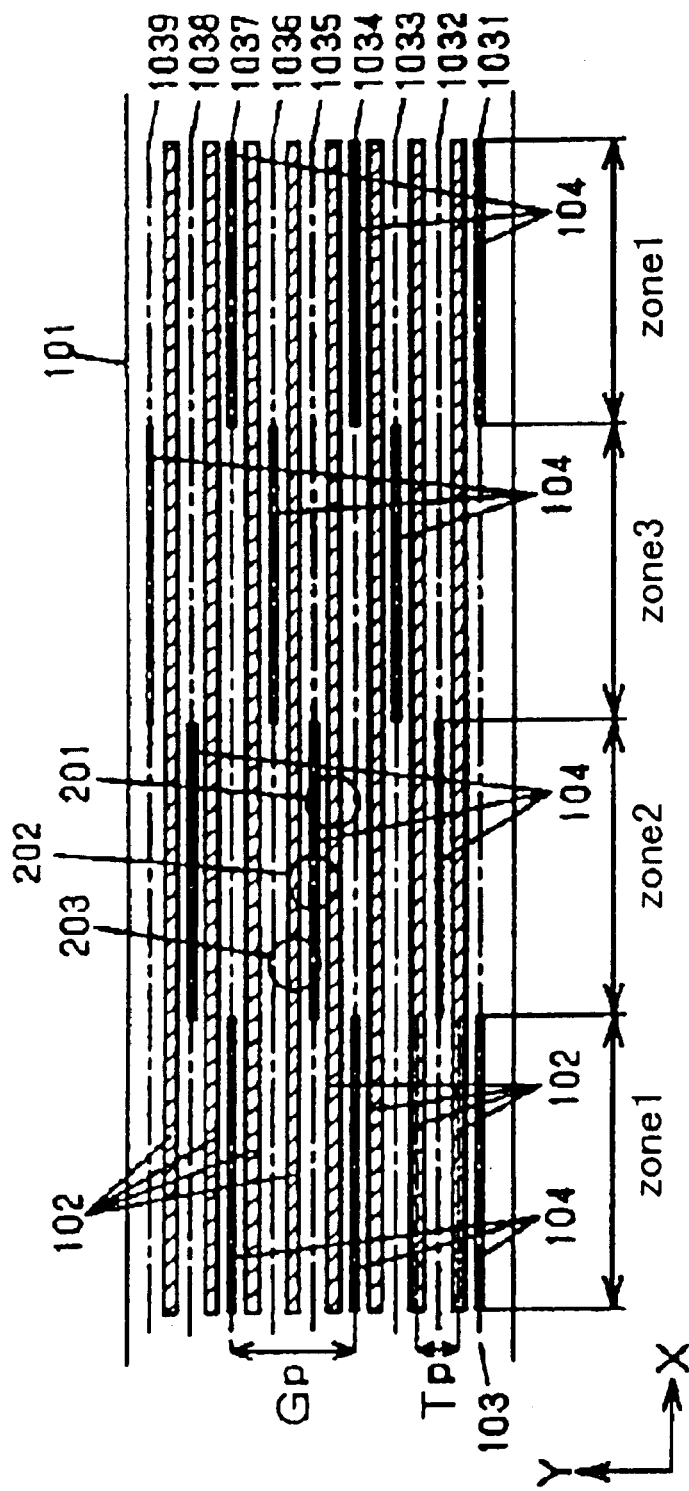
FIG. 1 is a diagram partially showing the configuration of a magnetic tape as an information storing medium in accordance with the first embodiment of the present invention.

FIG. 1 is a diagram showing the configuration of a magnetic tape serving as an information storing medium in accordance with the first embodiment of the present invention. Several series of information (eight in FIG. 1) are recorded on this magnetic tape 101 serving as the information storing medium. These series of information are called information tracks 102. The spacing between an information track and its neighboring information track is called information track spacing, and is denoted as Tp. Guide tracks 103 for optical tracking control also are arranged on the magnetic tape 101. Grooves 104 are arranged in the guide tracks 103 as tracking marks. The grooves 104 are convex or concave portions having a suitable depth and width. Generally, a favorable tracking signal is generated when their depth is about one eighth to one quarter of the wavelength $\lambda$ of the irradiated light. The magnetic tape 101 is partitioned into a number of different zones, due to the arrangement of the grooves 104 in the guide tracks 103. In the example shown in FIG. 1 there are three kinds of zones 1 to 3. In zone 1, guide grooves 104 are arranged at the outermost guide track 1031, the guide track 1034 three tracks away from there and the guide track 1037 again three tracks away. In zone 2, grooves 104 are arranged in the guide tracks 1032, 1035, and 1038. In zone 3, grooves 104 are arranged in the guide tracks 1033, 1036, and 1039. The distance from a guide track in which a groove 104 is arranged to the next guide track in which a groove 104 is arranged in a certain zone is called Gp. In this example, Gp=3×Tp. With this arrangement, the actual track spacing Gp of the guide tracks for each zone can be increased.

The three light beams emitted from the optical head 300 (see FIG. 3) form the three spots 201, 202 and 203 on the magnetic tape 101. The three spots 201, 202 and 203 are arranged obliquely with respect to the guide tracks 103 on the magnetic tape 101, and are irradiated at different positions in the Y-direction. The three light beams reflected from the magnetic tape 101 return to the optical head and enter a photo-detector.

FIG. 2(a) is a circuit diagram of the circuit serving as a tracking signal generation means in this embodiment. The photo-detectors 501, 502 and 503 receive the light beams 204, 205 and 206, and output a signal corresponding to the irradiated light amount. Here, the light beam 204 corresponds to the spot 201 on the magnetic tape 101, the light beam 205 corresponds to the spot 202, and the light beam 206 corresponds to the spot 203. The signals output from the photo-detectors 501 to 503 are sent to I-V amps 504 to 506, which give out a voltage signal. The signal given out by the I-V amp 504 is called S1, the signal given out by the I-V amp 505 is called SM, and the signal given out by the I-V amp 506 is called S2. The differential amplifier circuit 507 receives the signals S1 and S2 and gives out a differential signal. The signal given out by the differential amplifier circuit 507 is entered into a sample-and-hold circuit 510 serving as a signal holding means. The sample-and-hold circuit 510 receives the signal from the control circuit 512, and samples and holds the tracking signal. The signal output from the sample-and-hold circuit 510 is given out from the terminal 508 as the tracking signal. A clock generation circuit 511 receives the signal SM given out from the I-V amp 505, and outputs a clock signal having a rising flank or a falling flank synchronous with the switching of the zones in which the guide tracks and information tracks are recorded. A control circuit 512 serving as a selection control means receives an output signal from the clock generation circuit 511, and outputs a control signal that controls the sample-and-hold circuit such that a specific kind of zone is derived selectively, the output signal of the differential amplifier circuit 507 is sampled in that zone, and the signal is held for the other zones. Based on the tracking signal obtained from the terminal 508, the control means performs tracking control. After the tracking signal has passed a phase compensation circuit (not shown in the drawings) in the tracking control means, it is amplified by a transfer system drive circuit, and transmitted to the motive force of the transfer system. Thus, a tracking control can be realized that follows the spots 201, 202, and 203 with respect to movements in a direction perpendicular to the information tracks 102.

Figure 2:
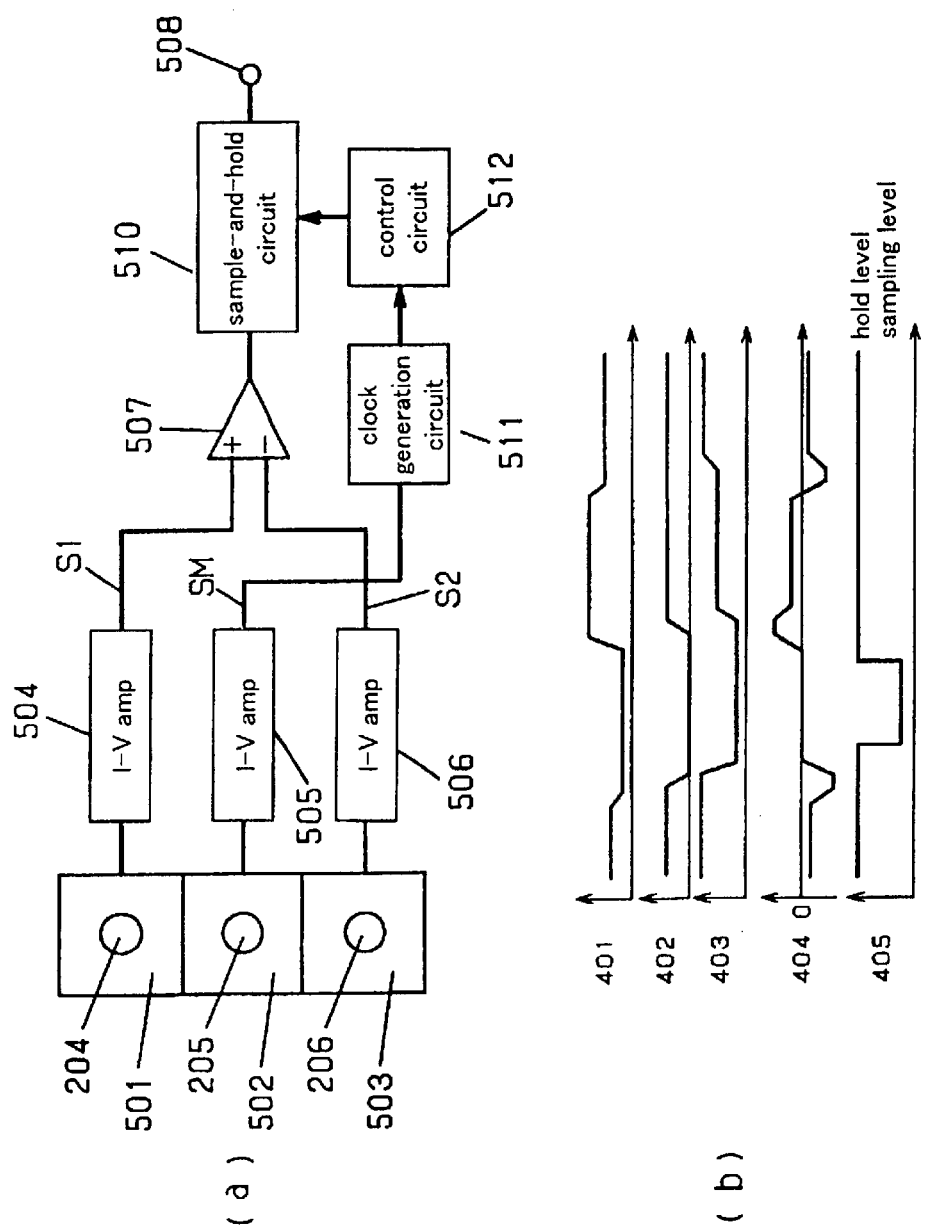
FIG. 2(a) and FIG. 2(b) are a block diagram of a circuit for obtaining the tracking signal from an information storing medium of the first embodiment of the present invention, and a diagram of the signal waveforms at various components.

FIG. 2(b) shows the signal waveform for all parts in FIG. 2(a). In this example, the signals show an example for when the spot 202 moves from the left to the right along the guide track 1035. The signal S1 in FIG. 2 is denoted as 401, the signal SM is denoted as 402, and the signal S2 is denoted as 403. The difference signal which is output by the differential amplifier circuit 507 is denoted as 404. The differential amplifier circuit 507 outputs a difference signal of signal S1 and signal S2. The control signal that the control circuit 512 gives into the sample-and-hold circuit 510 is denoted as 405. Here, an example is shown where the tracking signal is, obtained based on the groove 104 in the zone 2. There is no sampling of the signal in zone 2, and the signal is held for all other zones. In the method for attaining tracking with the three-beam method, signals that are output from the differential amplifier circuit 507 are disturbed before and after the switching of the zones, because the spot position differs in the X-direction. The control circuit 512 lets the sample-and-hold circuit 510 sample under avoidance of this disturbance period.

Figure 3:
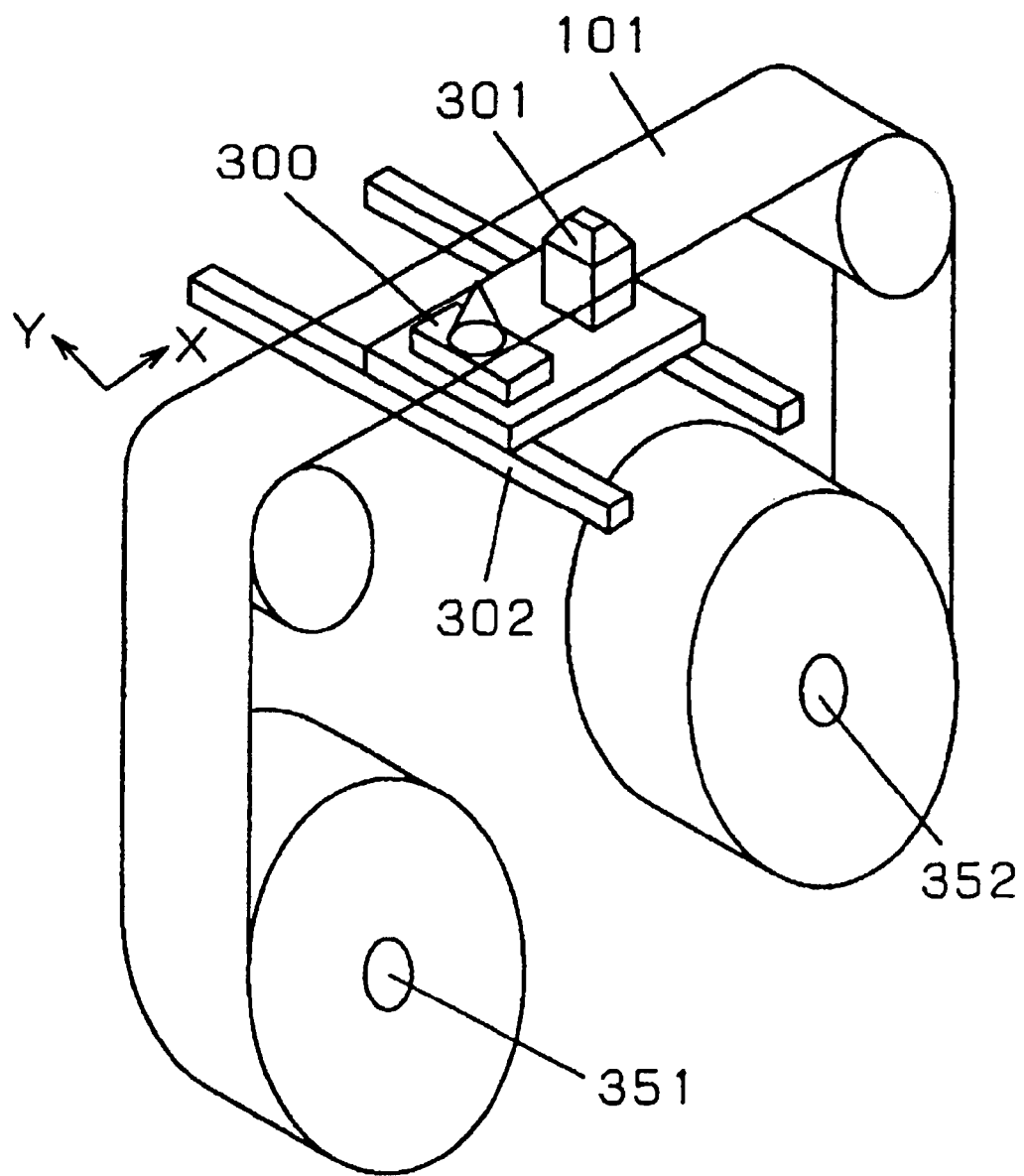
FIG. 3 is a perspective diagram showing the configuration of a magnetic tape drive as an information recording/reproducing device in accordance with the first embodiment of the present invention.

FIG. 3 illustrates the configuration of a magnetic tape drive serving as an information recording/reproducing device. The optical head 300 and the magnetic head 301 serving as a recording/reproducing means are carried on the same base and can be moved by a transfer system 302 in the width direction of the magnetic tape 101. Based on the tracking signal obtained from the terminal 508, a tracking control is performed that positions the magnetic head 301 above the information track 102 of the magnetic tape 101. The magnetic tape 101 is wound from a reel 351 to a reel 352 or, conversely, from the reel 352 to the reel 351, so that the magnetic head 301 and the magnetic tape move relatively to each other, while information is recorded and/or reproduced.

Figure 4:
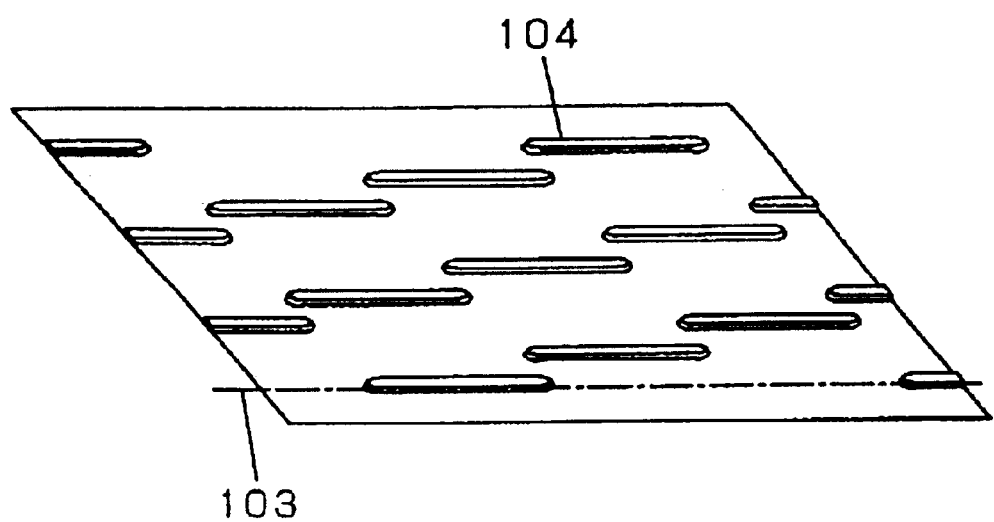
FIG. 4 is a perspective view partially showing the structure and the arrangement of the grooves in the guide tracks on a magnetic tape according to the first embodiment of the present invention.

FIG. 4 shows the pattern of the grooves 104 on the magnetic tape 101. The grooves 104 are made of convex portions or concave portions on the guide track 103 (in FIG. 4, they are convex portions).

Information can be recorded on and/or reproduced from other information tracks by switching the zones for obtaining the tracking signal and performing a track jump to different guide tracks.

The density of the information tracks can be increased without changing the spot size on the magnetic tape by partitioning the guide tracks into several zones and arranging the guide grooves 104 serving as tracking marks in suitable spacings, as shown in this embodiment. This makes it easy to realize an information storing medium with high density while maintaining compatibility with conventional low density information media.

Moreover, since the density of the information tracks can be increased with the same spot size, the reliability of the tracking servo can be kept high.

And, since the spot size can be big, the optical system can be simplified and the optical head can be of lower precision, which reduces the costs.

Here, there are three kinds of zones for the partitioning, but the present invention is not limited to three kinds of zones, and the same effect can be attained in information storing media whose zones are partitioned into two or more kinds of zones.

Also, this embodiment has been explained for the case that the method known as the three-beam method of, for example, optical disk drives is used to attain a tracking signal, but the same effect can be attained, if the tracking control is performed using the method known as the push-pull method of optical disk drives, selectively sampling and then holding tracking signals obtained for each zone.

Figure 5:
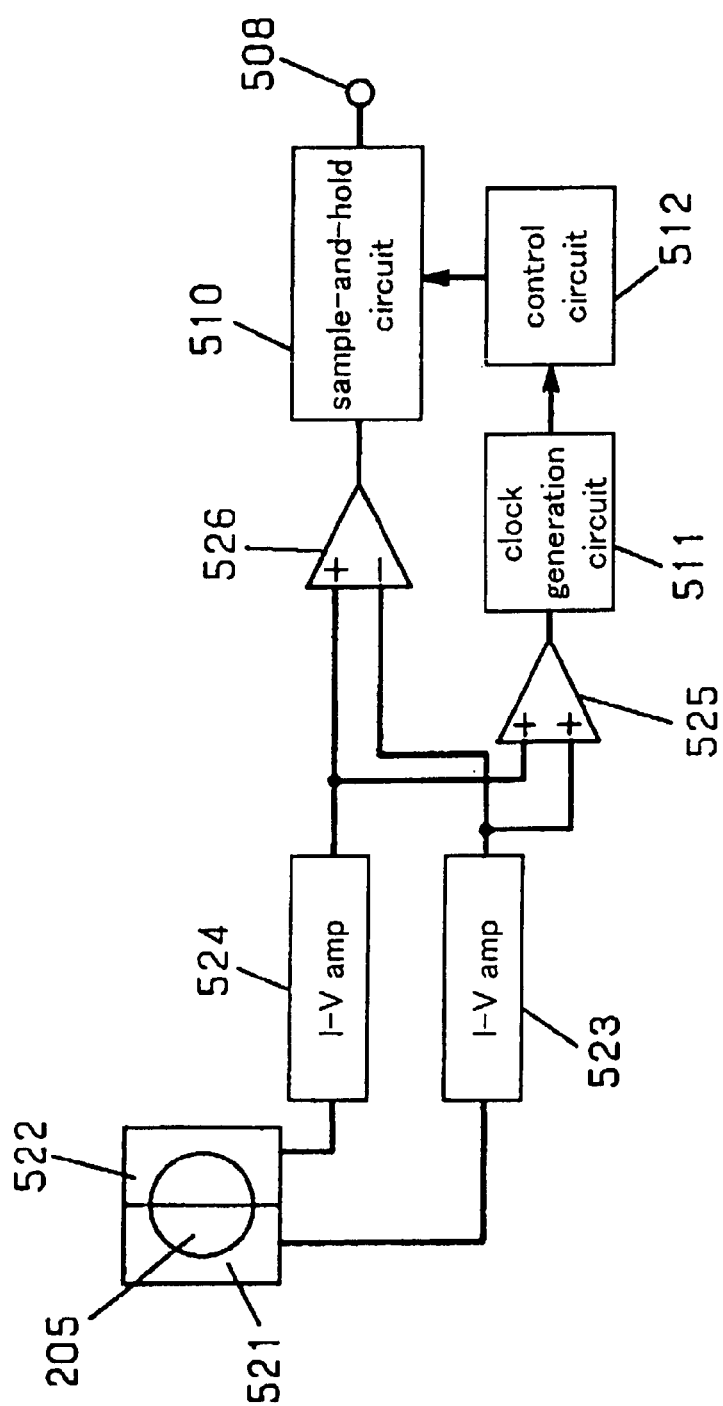
FIG. 5 is a block diagram of another circuit example for obtaining the tracking signal from an information storing medium of the first embodiment of the present invention.

FIG. 5 shows the configuration of a circuit for obtaining a tracking signal with the push-pull method. Only one light beam is irradiated from the optical head 300 onto the magnetic tape 101. The light beam is reflected by the magnetic tape 101 and irradiated onto a photo-detector. The optical beam 205 on the photo-detector is converted into an electric signal, in accordance with the light amount on the double-partitioned detection regions 521 and 522. The I-V amps 523 and 524 convert the signals output by the detection regions 521 and 522 from current signals into voltage signals. The differential amplifier circuit 526 receives the output signal from the I-V amps 523 and 524, and outputs a difference signal. The signal obtained from the sample-and-hold circuit 510 is a tracking signal obtained with the regular push-pull method. The signal that is output by the differential amplifier circuit 526 is sampled or held with the sample-and-hold circuit 510. On the other hand, an adding circuit 525 receives the output signal from the I-V amps 523 and 524, and outputs a sum signal. The signal that is output by the adding circuit 525 is proportional to the total light amount of the light beam 205. A clock generator circuit receives the output signal from the adding circuit 525 and generates a clock signal, and the control circuit 512 determines the timing for the sampling and holding of the sample-and-hold circuit 510.

Because in this case there is only one beam that is given out by the optical head, the configuration of the optical head can be simple. Moreover, because the period in which the signal is disturbed when switching the zones becomes shorter, the period for sampling with the sample-and-hold circuit can be extended.

When a tracking signal is obtained with such a method, the effect can be attained that the density of the information tracks can be increased even with a larger spot, if a magnetic tape 101 that is an information storing medium in accordance with the present invention is used.

Figure 6:
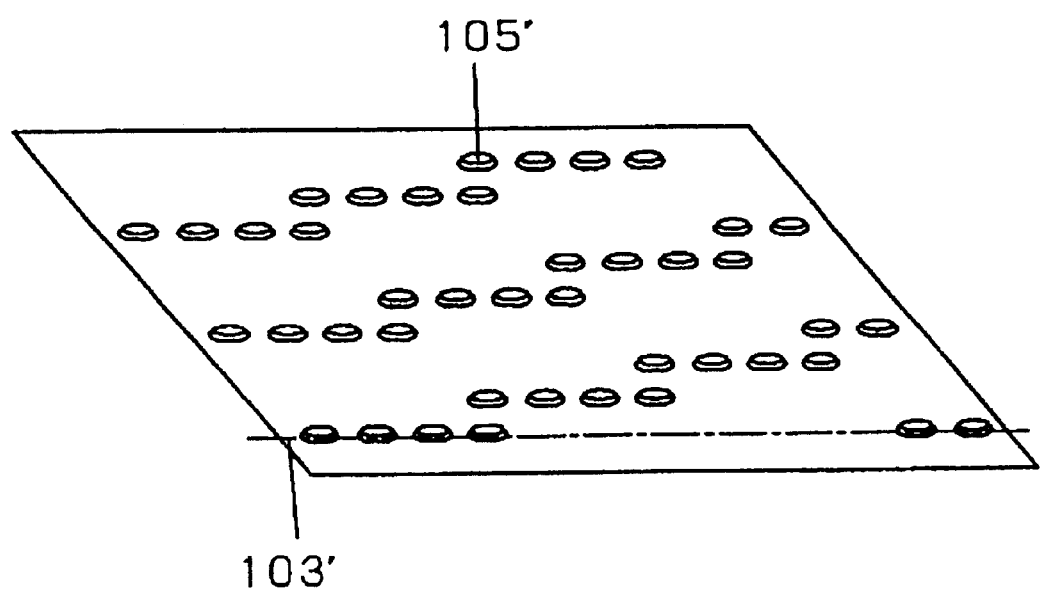
FIG. 6 is a perspective view partially showing the structure and the arrangement of the pits in the guide tracks on the magnetic tape in the first embodiment of the present invention.

Moreover, rows of pits 105' serving as tracking marks can be arranged on the guide tracks 103', as shown in FIG. 6. Also in this case, the information storing medium is partitioned into several kinds of zones, and the pit rows are arranged only in certain zones. Also in this case, the same effect can be attained as when providing grooves 104 as shown in FIG. 4. When tracking is attained by the three-beam method, the signals obtained from the light beam can be modulated by providing pit rows. If the pit length and the relative speed between information storing medium and light beam are maintained at a certain value, a certain modulation frequency for the signal is attained. By extracting this specified modulation frequency with a band-pass filter in a circuit system, the influence of stray light or irregularities in the reflectivity of the information storing medium can be suppressed, and a reliable tracking signal can be obtained.

Figure 7:
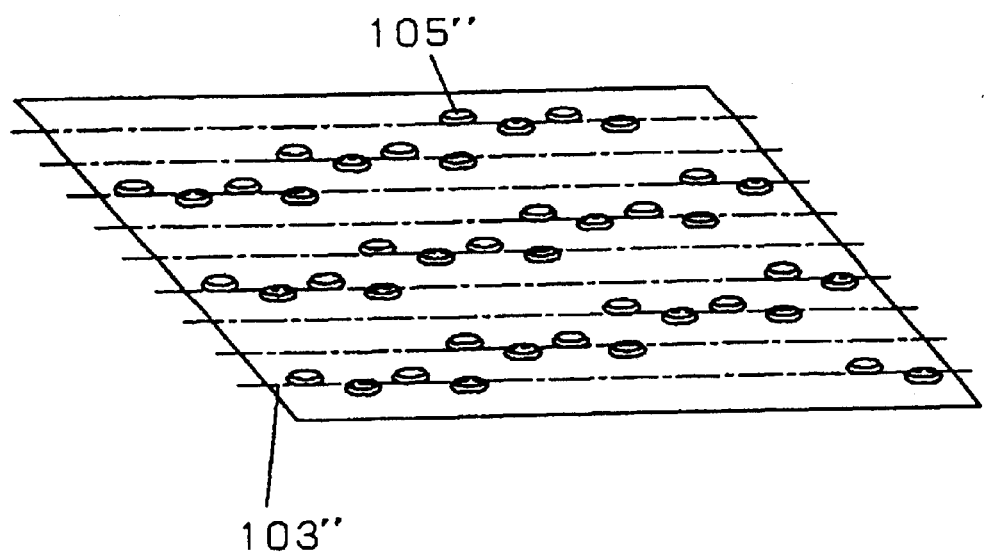
FIG. 7 is a perspective view partially showing the structure and another arrangement of the pits in the guide tracks on the magnetic tape in the first embodiment of the present invention.

It is also possible to offset the pits 105" serving as the tracking marks alternatingly with respect to the guide track 103", as shown in FIG. 7. In this case, a tracking signal can be obtained with the method known as the sample-servo method with, for example, an optical disk drive.

Figure 8:
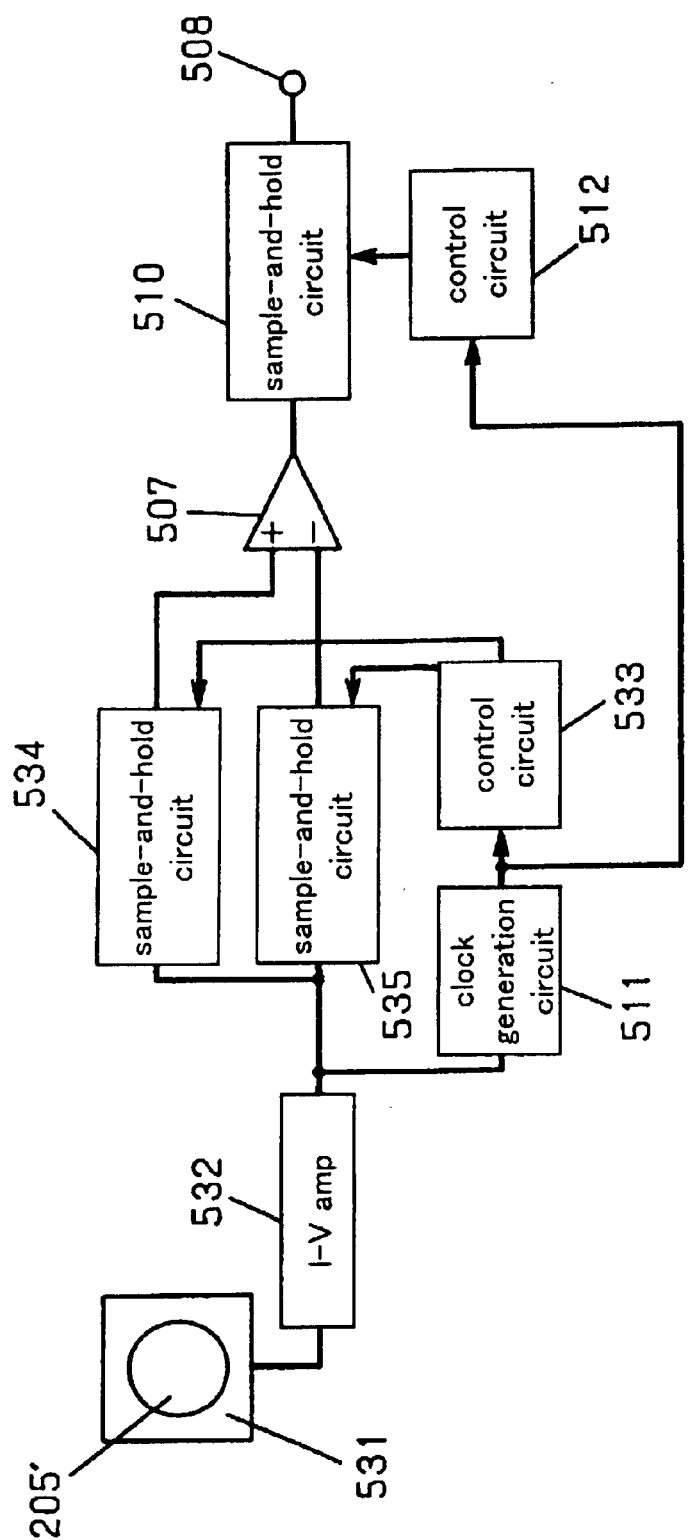
FIG. 8 is a block diagram of yet another circuit example for obtaining the tracking signal from an information storing medium of the first embodiment of the present invention.

FIG. 8 shows the configuration of a circuit for obtaining a tracking signal with the sample-servo method. A photo-detector 531 converts the light beam 205', which has been reflected by the magnetic tape 101, into an electric signal, corresponding to the light amount. The signal that is output from the photo-detector 531 is converted by the I-V amp 532 from a current signal into a voltage signal. The clock generation circuit 511 receives the output signal from the I-V amp 532, and generates a clock signal. The control circuit 533 receives the clock signal, and controls the timing for sampling and holding with the two sample-and-hold circuits 534 and 535. The two sample-and-hold circuits 534 and 535 sample and hold the output signal from the I-V amp 532. The sample-and-hold circuit 534 samples and holds the signal with a timing that is set when the light beam passes positions where pits 105 are arranged to the right of the guide track 103, and the sample-and-hold circuit 535 samples and holds the signal with a timing that is set when the light beam passes positions where pits 105 are arranged to the left of the guide track 103. The differential amplifier circuit 507 receives the output signals of the two sample-and-hold circuits 534 and 535, and outputs a difference signal. The signal that is output from the differential amplifier circuit 507 is the tracking signal obtained by a regular sample-servo method. The sample-and-hold circuit 510 samples the output of the differential amplifier circuit 507, and holds it. The control circuit 512 receives the clock signal, and determines the timing for sampling and holding of the sample-and-hold circuit 510.

In this embodiment, there is only one beam output from the optical head, and the configuration of the photo-detector can be simplified, so that the configuration of the optical head can be simplified. Obtaining a tracking signal with this technique brings about the effect that the density of the information tracks can be increased even with a large spot, if a magnetic tape 101 that is an information storing medium in accordance with the present invention is used.

The convex portions or concave portions of the tracking marks can be formed by several methods, for example, focussing a beam from a laser (for example, an argon ion laser) to form the tracking marks by thermal deformation, or press-forming with a die.

As other examples for tracking marks, it is also possible to use marks with different reflectivity, or marks with partially different refractive index, instead of the convex portions or concave portions. To form marks with different reflectivity, any known technique, such as vapor deposition or printing, can be applied.

It is also possible to arrange magnetic marks similarly to the pits 105 in FIG. 7, and obtain a tracking signal by detecting these marks with an optomagnetic head.

Figure 9:
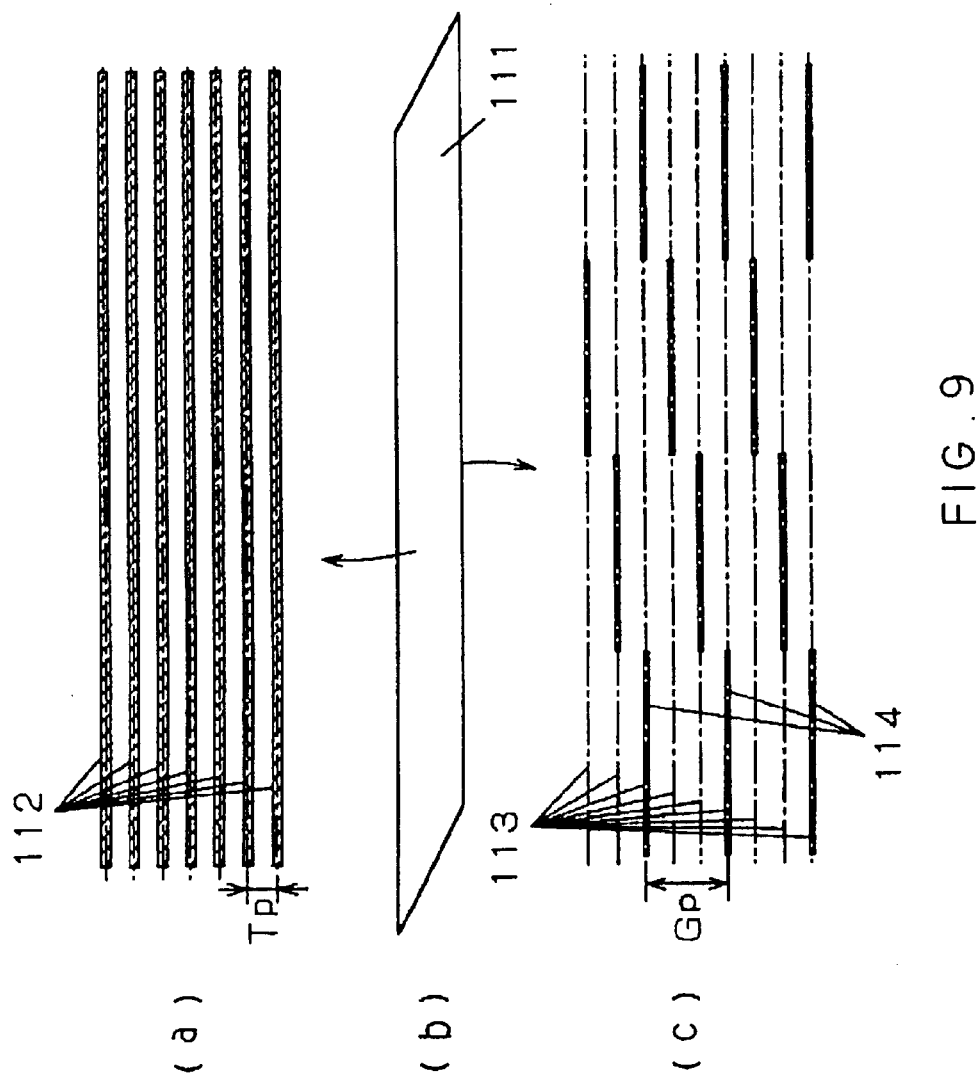
FIG. 9(a) is a diagram illustrating the configuration of the information tracks formed on the upper surface of a magnetic tape in another configuration of a magnetic tape as an information storing medium in accordance with the first embodiment of the present invention.
FIG. 9(b) is a perspective view of a magnetic tape in this other configuration of a magnetic tape as an information storing medium in accordance with the first embodiment of the present invention.
FIG. 9(c) is a diagram illustrating the configuration of the guide tracks formed on the lower surface of a magnetic tape in the other configuration of a magnetic tape as an information storing medium in accordance with the first embodiment of the present invention.

Moreover, it is also possible to arrange the information tracks and the guide tracks on the front side and the rear side of a magnetic tape 111 serving as the information storing medium, as shown in FIG. 9. In FIG. 9, information tracks 112 are lined up at a spacing Tp on the front side of the magnetic tape 111, and guide tracks 113 are arranged on the rear side. Like in the example of FIG. 1, the guide tracks 113 are arranged in grooves 114. In this case, if the position of the information tracks on the front side matches that of the guide tracks, variations between different information recording/reproducing apparatuses can be suppressed, so that a reliable recording and reproducing of information becomes possible. Moreover, because guide tracks are not formed on the front side, information tracks can be formed in their place, and the information recording capacity can be increased. If guide tracks and information tracks are formed on different surfaces of the information storing medium, the surface where the information tracks are recorded can be a magnetic recording layer, and the surface where the guide tracks are recorded can be an optomagnetic recording layer, that is, different recording layers can be used.

Moreover, when providing information tracks also on the rear side of the magnetic tape shown in FIG. 1, it is also possible to provide information tracks on both sides, but guide tracks only on one side. In this case, the information recording density can be increased even further. Also for this case, if the structure of the guide tracks as explained for the present invention is used, a high recording density can be realized with a conventional spot size. When the numerical aperture NA of the focussing system of the optical head 300 is 0.04 and the wavelength λ is 800 nm, the spot diameter on the magnetic tape 101 is about 20 μm. In conventional examples, an information track spacing Tp of about 20 μm was the limit. With the present embodiment, on the other hand, the information track spacing Tp can be as small as about 7 μm by arranging grooves 104 in three kinds of zones of the magnetic tape 101. And, if they are arranged in five kinds of zones, an information track spacing of about 4 μm can be realized. Thus, a reliable tracking control can be performed with a magnetic tape 101 with an information recording density that is three to five times higher, using a conventional optical head 300.

Figure 10:
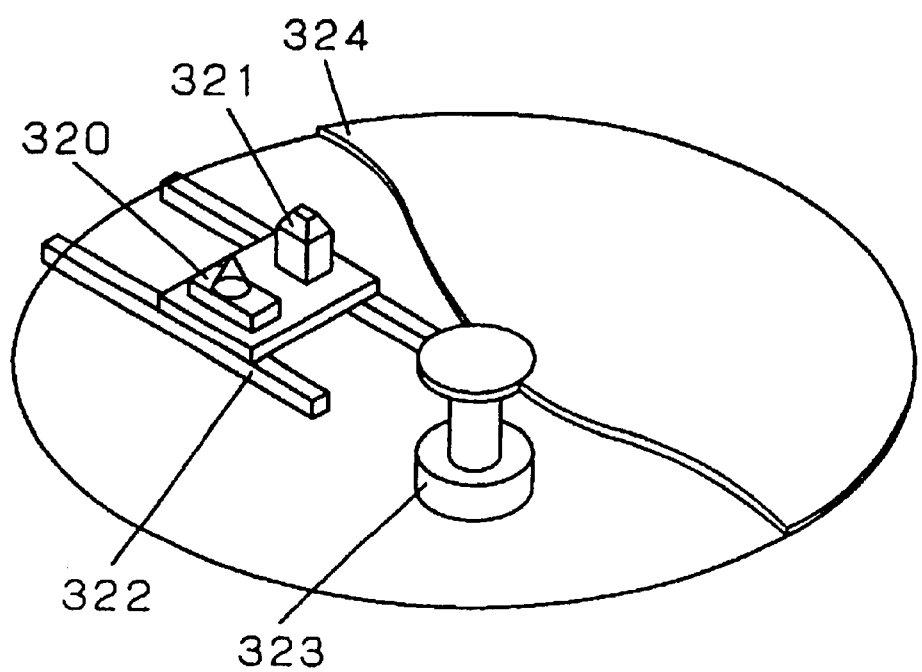
FIG. 10 is a partially cross-sectional and transparent perspective diagram showing the configuration of a magnetic disk drive as an information recording/reproducing apparatus in accordance with the first embodiment of the present invention.

This embodiment has been explained by way of examples assuming a magnetic tape as the information storing medium and a magnetic tape drive as the information recording/reproducing apparatus, but there is no limitation to this configuration. For example, it can also be applied to disk-shaped media as shown in FIG. 10. In FIG. 10, the magnetic disk 324 serving as the information storing medium is rotated by a motor 323. A transfer system 322 moves the optical head 320 and the magnetic head 321 in the radial direction of the magnetic disk 324. A tracking signal is obtained by irradiating a light beam onto guide tracks 123 provided on the magnetic disk 324. Recording/reproducing information on the magnetic tracks 122 is performed with a magnetic head 321 serving as a recording/reproducing means.

Figure 11:
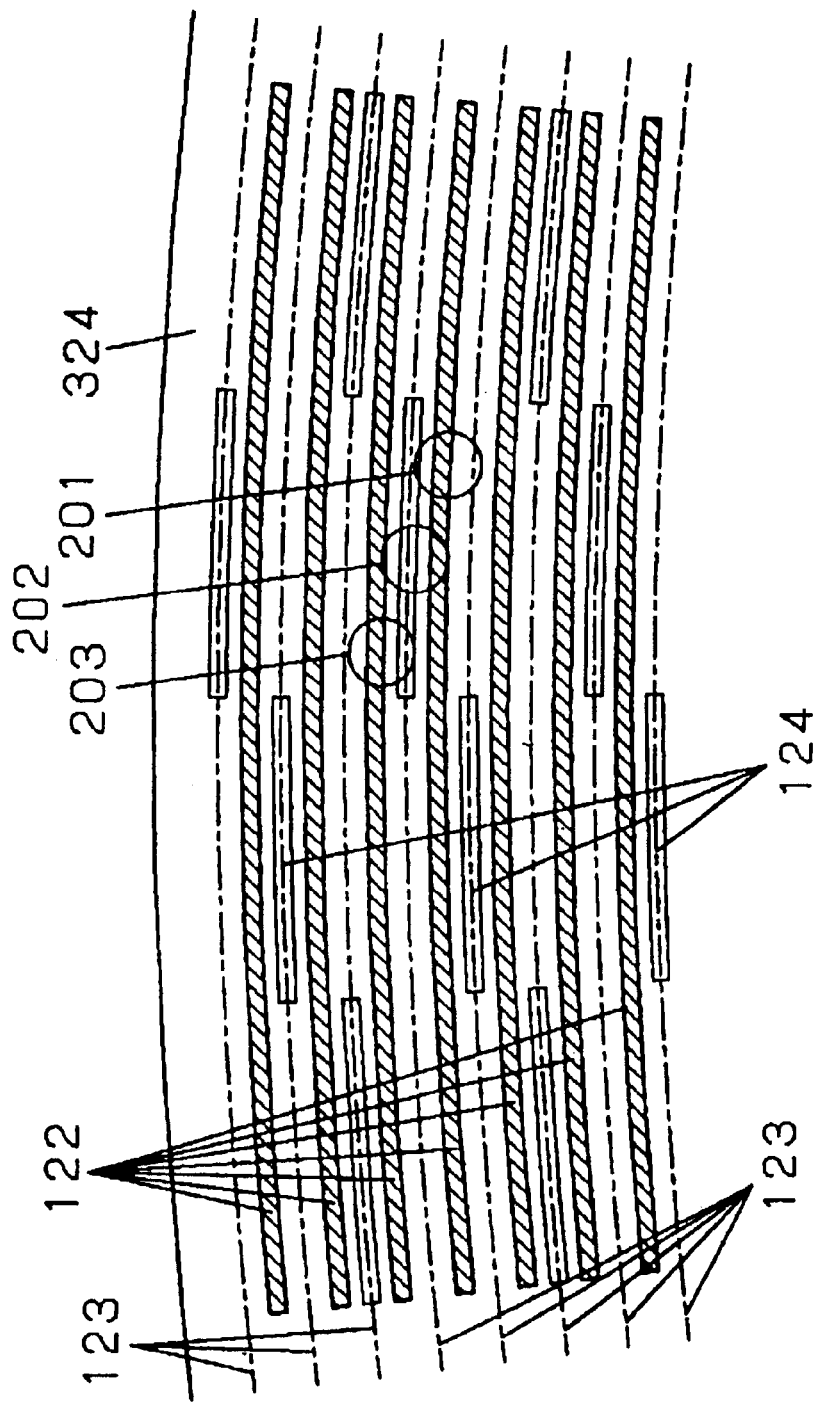
FIG. 11 is a diagram partially showing the configuration of a magnetic disk as an information storing medium in accordance with the first embodiment of the present invention.

FIG. 11 shows an example of how the magnetic tracks 122, the guide tracks 123, and the grooves 124 on the guide tracks are arranged. This configuration is substantially the same as the one shown in FIG. 1. In FIG. 1, the tracks and grooves are arranged in straight lines, whereas in the magnetic disk 324 in FIG. 11, they are arranged as concentric rings or as helical arcs. If such a magnetic disk 324 is used, the effect of the present invention can be equally attained.

The above explanations related to magnetic disks, but the same effects of course also can be attained with optical disks or optomagnetic disks, that record/reproduce information with light. In this case, instead of the magnetic head 321, an optical head is necessary as a recording/reproducing means to record or reproduce information. Moreover, in combination with techniques for recording/reproducing information in an optical head to obtain a large tracking signal (waveform equalization/crosstalk cancellation, PRML, Viterbi decoding, Irister, MAMMOS, magnetic domain magnification reproduction, etc.), it is possible to perform the tracking and the recording/reproducing of information with a single head.

Here, PRML means partial response maximum likelihood compound method, and Ailista is a method for improving the resolution of the reproduction signal by realizing a magnetic aperture using temperature differences on the disk. MAMMOS is a method for improving resolution without dropping the signal amplitude by magnetically enlarging the recorded marks.

Figure 12:
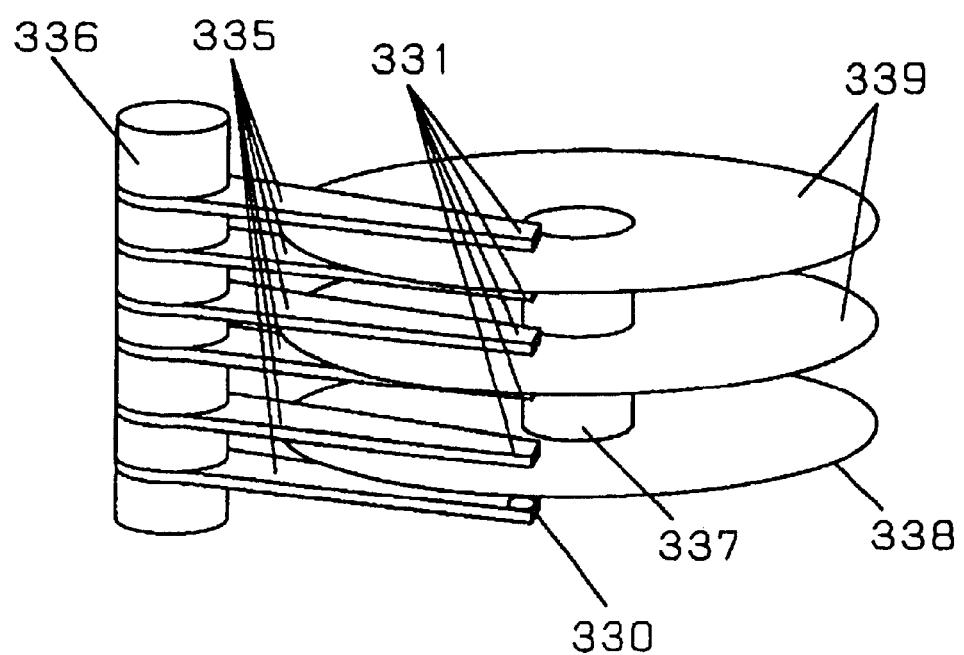
FIG. 12 is a perspective diagram showing-the configuration of a fixed magnetic disk drive as an information recording/reproducing apparatus in accordance with the first embodiment of the present invention.

Furthermore, the present embodiment also can be applied to fixed magnetic disks (hard disks) as shown in FIG. 12. The optical head 330 and the magnetic heads 331 are carried by arms 335, and moved in synchronization by a transfer system driving motor 336. On the bottom side of the magnetic disk 338, guide tracks 123 are arranged in circular arcs, and on the top side of the magnetic disk 338 as well as on both sides of the magnetic disks 339, information tracks 122 are arranged in concentric circles or in helical arcs. Grooves 124 are arranged in the guide tracks 123, like in FIG. 11. Tracking control is performed with the tracking signal obtained with the guide tracks 123, and information is recorded/reproduced on the information tracks 122. The effects of the present invention also can be attained with such a fixed magnetic disk.

Second Embodiment

Figure 13:
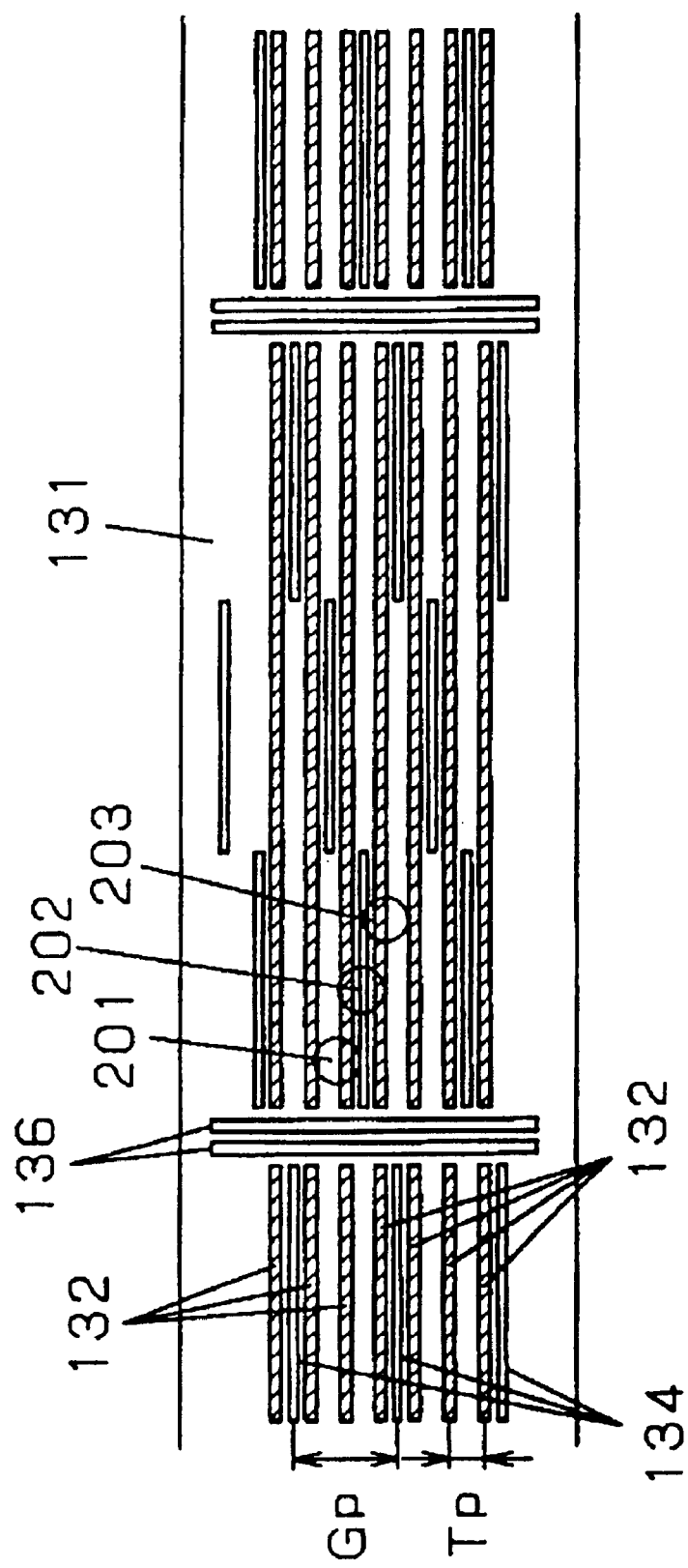
FIG. 13 is a diagram partially showing a configuration of a magnetic tape as an information storing medium in accordance with a second embodiment of the present invention.
Figure 14:
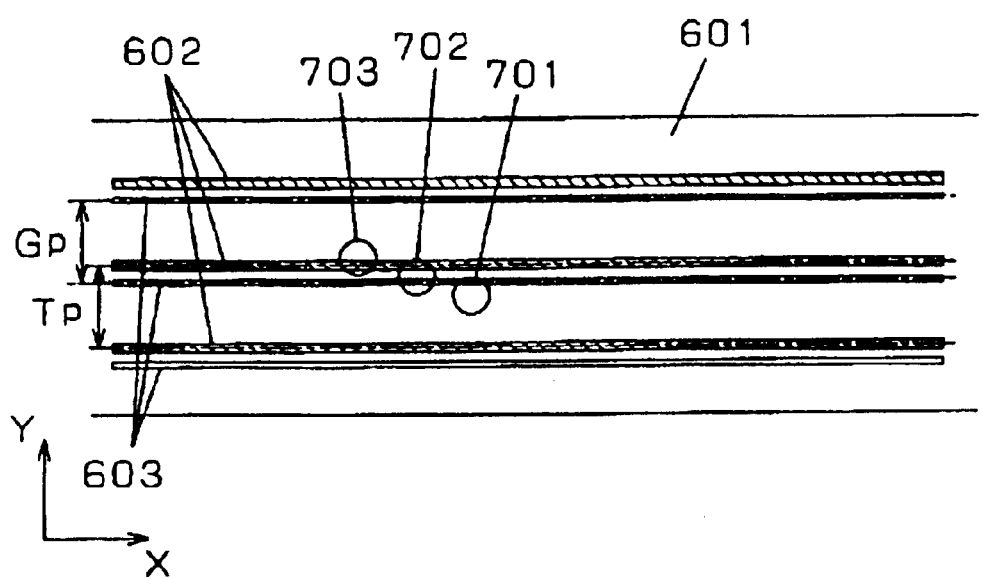
FIG. 14 is a diagram showing a configuration of a magnetic tape as a conventional example of an information storing medium.
Figure 15:
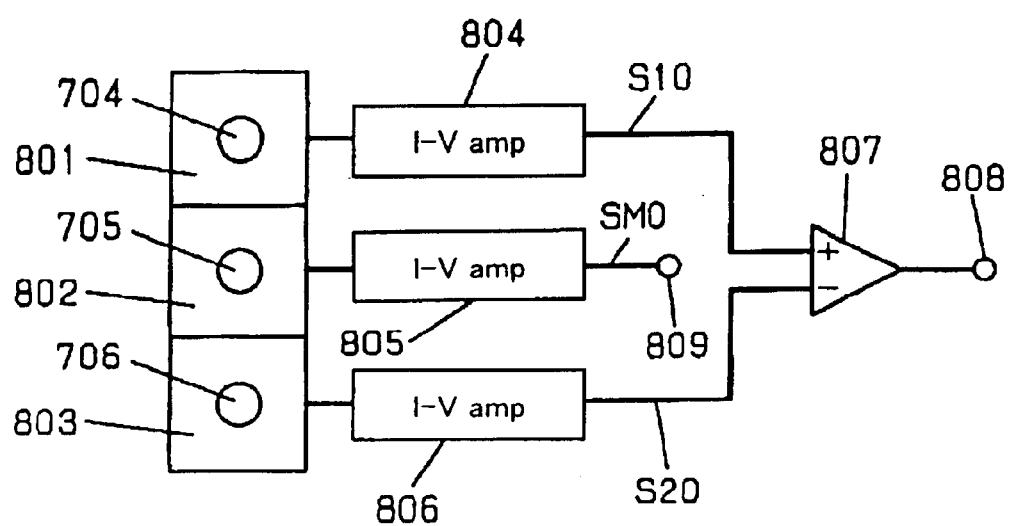
FIG. 15 is a block diagram of a circuit for obtaining a tracking signal from a conventional information storing medium.

FIG. 13 is another embodiment of the present invention. In FIG. 13, the magnetic tape 131 serving as the information storing medium shown in FIG. 1 of the first embodiment is provided with segment marks 136, marking a series of zone segments. This allows the precise detection of a targeted zone, and makes the tracking control even more reliable.

Moreover, if addresses are encoded and recorded in the segment marks 136, the retrieval of a position on the information storing medium can be made faster as well as more precise.

Like the first embodiment, this configuration can be applied not only to the magnetic tape shown here, but also to magnetic disks, optical disks, and other information storing media.

What is claimed is:

1. An information recording/reproducing apparatus, comprising:
    an optical head for irradiating light onto an information storing medium having guide tracks and independent information tracks for storing information, wherein the information storing medium is partitioned into different kinds of zones, and tracking marks on the guide tracks are selectively located in the zones depending on the kind of zone;
    a tracking signal generation means for outputting a tracking signal based on a signal that is output from the optical head, the tracking signal generation means comprising a selection control means for controlling the selection of a certain kind of zones on the information storing medium partitioned into a plurality of zones and a signal holding means for holding a signal obtained from a selected kind of zone;
    a control means for performing tracking control based on the tracking signal; and
    a recording/reproducing means for performing at least one of recording and reproducing information with respect to the information storing medium.

2. A tracking method using an information storing medium having a guide track and an independent information track for storing information, the information storing medium being partitioned into different kinds of zones, and tracking marks on the guide tracks being selectively located in the zones depending on the kind of zone, the method comprising the steps of:
    irradiating light onto the information storing medium;
    controlling the selection of a certain kind of zone on the information storing medium partitioned into a plurality of zones;
    holding a signal obtained from a selected kind of zone; and
    performing tracking control based on a tracking signal obtained from the held signal.

* * * * *